United States Patent [19]

Jessup et al.

[11] 4,305,304

[45] Dec. 15, 1981

[54] MOTOR SUSTAINED STORED ENERGY GYROSCOPE

[75] Inventors: John M. Jessup, Boyne City; Edmund G. Brochu, Walloon Lake; Jack P. Moran; Maurice Orlarey, both of Charlevoix, all of Mich.

[73] Assignee: The Bendix Corporation, Teterboro, N.J.

[21] Appl. No.: 33,291

[22] Filed: Apr. 25, 1979

[51] Int. Cl.³ .................. G01C 19/08; G01C 19/26
[52] U.S. Cl. .......................................... 74/5.12; 74/57
[58] Field of Search .................. 74/5.12, 5.14, 5.7, 74/5.1; 310/181

[56] References Cited

U.S. PATENT DOCUMENTS

| | | | |
|---|---|---|---|
| 2,732,721 | 1/1956 | Summers | 74/5.12 X |
| 2,918,869 | 12/1959 | Cumming et al. | 74/5.7 |
| 2,921,472 | 1/1960 | Friedman et al. | 74/5.12 |
| 3,274,837 | 9/1966 | Fenton et al. | 74/5.7 |
| 3,323,379 | 6/1967 | Brastow et al. | 74/5.12 X |
| 3,434,354 | 3/1969 | Voge | 74/5.12 |
| 3,449,960 | 6/1969 | Kleiman | 74/5.12 X |
| 3,845,995 | 11/1974 | Wehde | 310/1.56 X |
| 3,860,843 | 1/1975 | Kawasaki et al. | 310/156 X |

*Primary Examiner*—Rodney H. Bonck
*Attorney, Agent, or Firm*—Anthony F. Cuoco; William F. Thornton

[57] ABSTRACT

A stored energy gyroscope includes a power spring contained within the gyroscope rotor. A latching arm is positioned to hold the rotor in place with the spring fully wound, and when the latching arm is released from the hold position the power spring unwinds to drive the rotor up to speed. A sustaining motor contained within the rotor extends the useful life of the gyroscope by maintaining angular momentum of the rotor and eliminating deceleration torques upon dissipation of the spring power.

6 Claims, 6 Drawing Figures

MOTOR SUSTAINED STORED ENERGY GYROSCOPE

CROSS REFERENCE TO RELATED APPLICATIONS

The invention claimed herein utilizes a Pulse Type Permanent Magnet D.C. Motor claimed in commonly assigned U.S. application Ser. No. 33,292, filed on Apr. 25, 1979, by Christopher G. Todter and Maurice Orlarey.

FIELD OF THE INVENTION

This invention relates generally to stored energy gyroscopes and particularly to a spring powered gyroscope rotor. More particularly, this invention relates to a spring powered gyroscope rotor in combination with a sustaining motor for maintaining the angular momentum of the rotor and eliminating deceleration torques upon dissipation of the spring power. Still more particularly this invention relates to a gyroscope of the type described wherein the energizing spring and sustaining motor are contained within the gyroscope rotor.

DESCRIPTION OF THE PRIOR ART

Stored energy gyroscopes having sustaining motors may use a power spring which initially drives the gyroscope rotor as it unwinds and thereafter the sustaining motor drives the gyroscope rotor to maintain its angular momentum and eliminate deceleration torques. Prior to the present invention gyroscopes of the type described, while having the sustaining motor contained within the rotor, have had the power spring external thereto. The present invention is advantageous over the prior devices in that the power spring is contained within the rotor and becomes a part of the rotor mass. Further, the arrangement is such that all spring energy must be expended prior to uncaging of the gyroscope, whereby the spring energy is used more efficiently than has heretofore been the case and the uncaging error is minimized.

SUMMARY OF THE INVENTION

This invention contemplates a motor sustained stored energy gyroscope including a power spring contained within the gyroscope rotor. A latching arm holds the rotor with the spring in the fully wound condition so that the gyroscope is caged until the latching arm is released, whereupon the spring unwinds to impart angular momentum to the rotor. The arrangement described utilizes the weight of the spring as an active element and provides maximum angular momentum in the volume available.

Uncaging means contained within the rotor is arranged with the spring so that when the spring unwinds the gyroscope is uncaged. The arrangement is such that the rotor is up to a predetermined speed before the uncaging, and since there is no power spring torque being applied at this time, the uncaging error is minimized.

A sustaining motor is contained within the rotor. The torque required to maintain angular momentum of the rotor and eliminate deceleration torques upon dissipation of the spring power is provided by energizing the motor to create a magnetic field which interacts with a permanent magnet arrangement forming the motor rotor.

DESCRIPTION OF THE INVENTION

Figure 1:
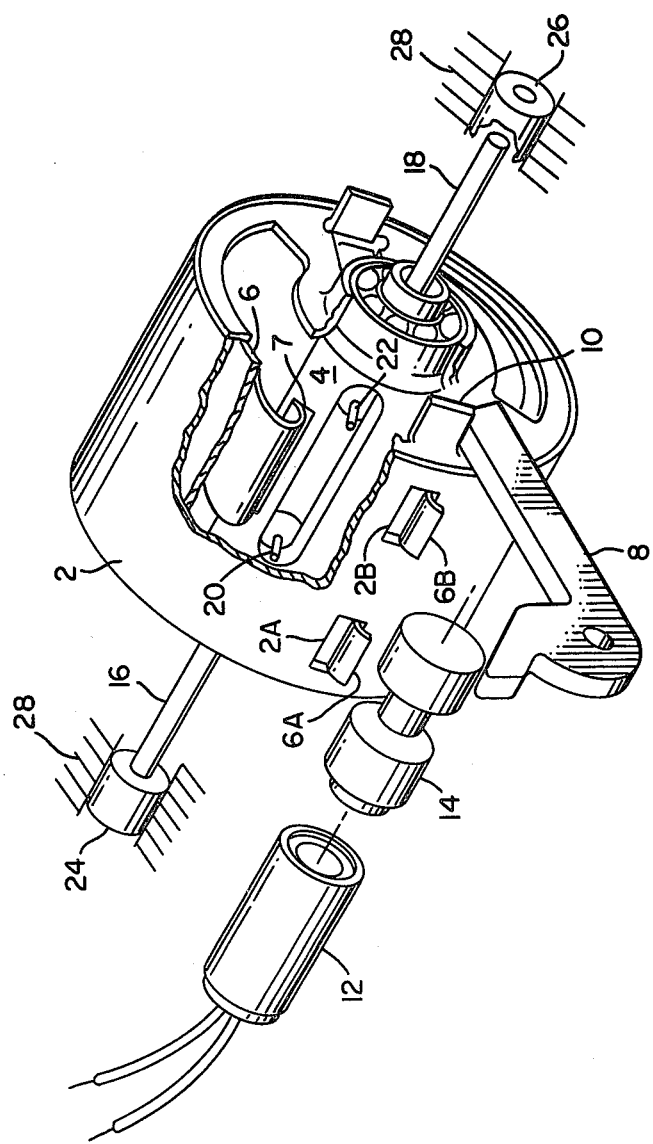
FIG. 1 is an isometric pictorial representation of a gyroscope rotor and caging mechanism according to the invention.

With reference to FIG. 1, a hollow gyroscope rotor 2 is arranged to rotate on a rotor arbor 4. A power spring 6 secured in a rotor arbor slot 7 and wound on rotor arbor 4 is secured to rotor 2 by spring tabs 6A and 6B extending through rotor slots 2A and 2B, respectively.

A latching arm 8 holds rotor 2 in place by being in contact with a longitudinally extending rotor tab 10 until the latching arm is released by a pyrotechnic explosive actuator 12. In operation, explosive actuator 12 actuates a caging plunger 14 which displaces latching arm 8 away from rotor tab 10 thus releasing the rotor from its held position. The latching arm is maintained away from rotor 2 by a detent spring (not shown).

Rotor arbor 4 has contained therein an uncaging mechanism which includes a pair of spring loaded caging rods 16 and 18 having cross pins 20 and 22, respectively. When rotor 2 is held in place as aforenoted, with power spring 6 fully wound on rotor arbor 4, rods 16 and 18 protrude from the ends of the rotor arbor and are aligned in bushings 24 and 26, respectively, disposed in a gyro frame 28, thus caging the gyro gimbals. In this connection it is to be noted that for purposes of illustration the invention will be described with reference to a two-axis displacement gyroscope.

Cross pins 20 and 22 are spring loaded against the end of power spring 6 as will be understood from FIG. 1 with the spring wound tight on rotor arbor 4. Upon release of rotor 2 from the held position as aforenoted, power spring 6 unwinds releasing itself from arbor 4 and cross pins 20 and 22 are displaced toward each other. Caging rods 16 and 18, due to the aforenoted displacement of spring loaded cross pins 20 and 22, retract into arbor 4 to uncage the gyro. Rotor 2 is brought up to speed through the stored spring energy. In the arrangement shown and described, the rotor is brought up to speed before the gyro is uncaged. Since there is no power spring torque applied at this time the uncaging error is minimized.

Figure 2:
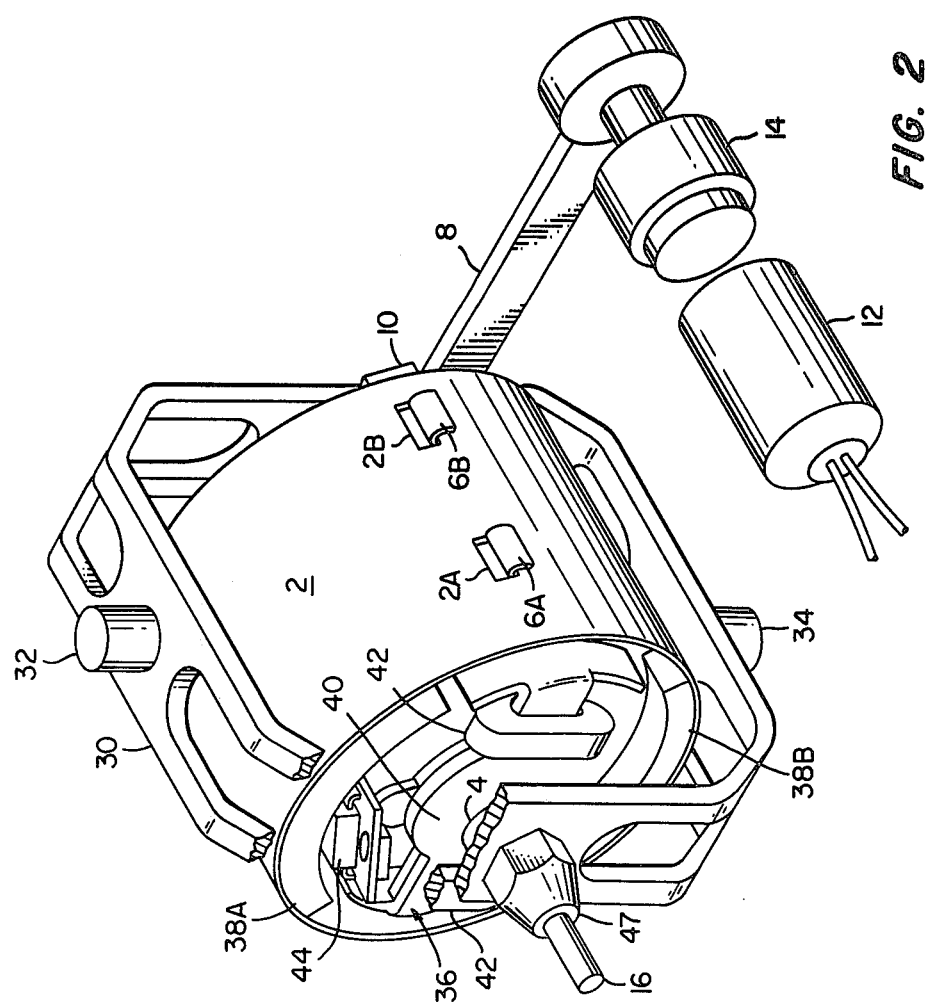
FIG. 2 is an isometric pictorial representation particularly showing the arrangement of the sustaining motor and gyroscope rotor according to the invention.

With reference now to FIG. 2, wherein corresponding elements are designated by corresponding numerals, rotor 2 is shown suspended in an inner gimbal 30 by conventional means (not shown) well known in the gyroscope art. Inner gimbal 30 carries trunnions 32 and 34 on opposite sides thereof for suspending gimbal 30 in an outer gimbal (not shown).

A particular sustaining motor which may be used with the invention may be a pulse type permanent magnet DC motor designated generally by the numeral 36. Motor 36 includes a rotor member including a pair of diametrically opposed flexible magnets 38A and 38B, a soft iron stator member 40, stator windings 42 carried by stator member 40 and a Hall Effect commutation switch 44.

Figure 3:
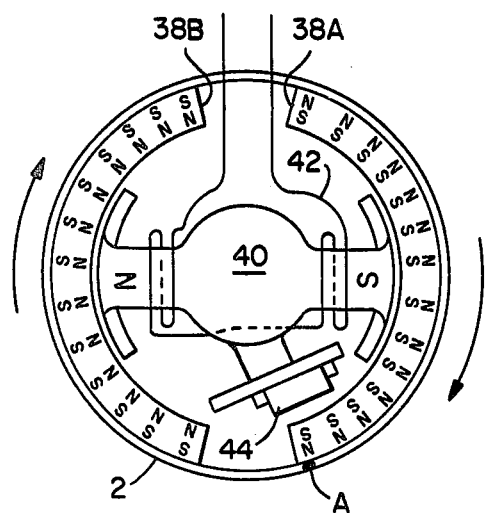
FIG. 3 is a diagrammatic representation showing the sustaining motor in an "ON" condition.
Figure 4:
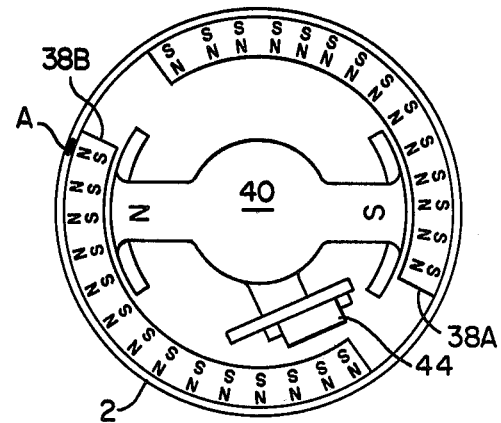
FIG. 4 is a diagrammatic representation showing the sustaining motor in an "OFF" condition.

Flexible magnets 38A and 38B, which may be of the type manufactured by Minnesota Mining and Manufacturing Co. under their trade designation Plastiform 1.4H, are of the type well known in the art and contain particles of magnetic material so as to provide North and South poles around the periphery of the magnets as will be illustrated with reference to FIGS. 3 and 4. Hall Effect switch 44, which may be of the 6SS series manufactured by Microswitch Co., is mounted on stator 40 and starts the motor as will be hereinafter described.

As illustrated in FIG. 2, flexible magnets 38A and 38B are supported on the inner periphery of rotor 2 at one end thereof and may be secured in grooves in the inner periphery by cementing or the like. Stator member 40 is supported on rotor arbor 4. A member (not shown) extends outwardly from the gimbal and has a threaded portion engaged by a nut 47. The arrangement is such that when nut 47 is tightened against gimbal 30, stator 40 is secured on arbor 4. The opposite side of gimbal 30 has a similar threaded portion and nut arrangement (not shown). Caging rods 16 and 18 extend through the gimbal nuts so as to be operable for engaging bushings 24 and 26 and for uncaging the gyroscope as described with reference to FIG. 1.

Figure 6:
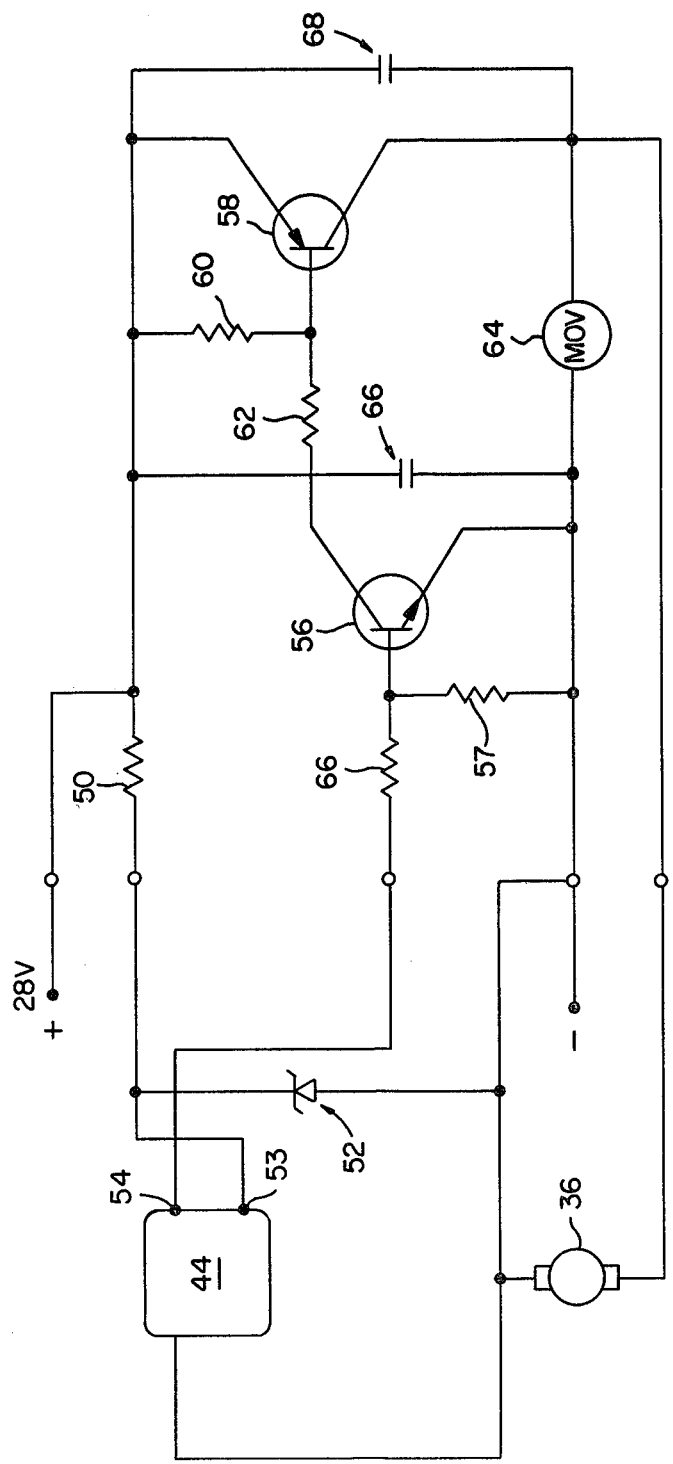
FIG. 6 is an electrical schematic diagram showing the driving electronics for the sustaining motor.

The operation of motor 36 is best illustrated with reference to FIGS. 3 and 4. Thus, when reference mark A on gyroscope rotor 2 aligns with Hall Effect switch 44 (0°), the switch turns on and a drive circuit such as shown in FIG. 6 and which will be hereafter described is activated to switch stator winding 42 to an "ON" condition developing a South pole opposing the South pole of magnet 38A as shown in FIG. 3. This repells magnet 38A to drive the gyroscope rotor in a clockwise direction (as shown by the arrows), which then causes the South pole of the stator to attract the North pole of magnet 38B. When the rotor has rotated approximately 150° the Hall Effect switch turns "OFF" (FIG. 4). Rotor 2 then coasts around to the point where the Hall Effect switch turns "ON" and the cycle repeats.

Figure 5:
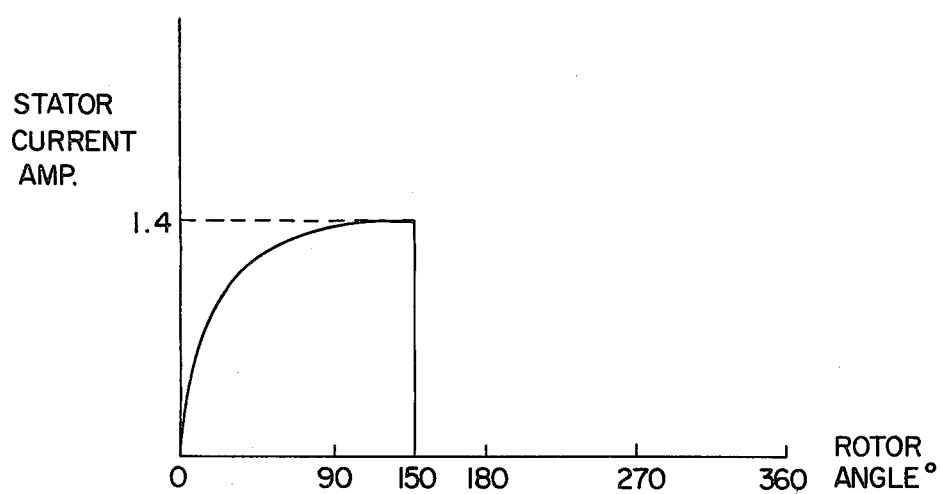
FIG. 5 is a graphical representation showing the electrical characteristics of the sustaining motor.

FIG. 5 is a diagrammatic representation showing the stator current developed as a function of the angle of rotor 2 for one cycle of operation.

Hence, it will be seen that motor 36 is effective to sustain high speed rotation after the motor has commenced rotation initiated by an activator external to the electric motor, i.e., power spring 6. In this connection it is noted that the motor is low in cost and small in size and weight to enhance the operating features of the gyroscope herein described. It is further noted that the motor is active while the rotor is powered by the spring, but does not sustain rotation of rotor 2 until the spring energy is dissipated. In this regard, the motor is active whenever the rotor position is such that the Hall Effect switch is turned on. However, the motor torque is insignificant compared to the torque provided by the unwinding spring.

The drive electronics for motor 36 is shown in schematic form in FIG. 6. Hall Effect switch 44 operates from a 5 to 15 volt power supply and is supplied with this voltage at a terminal 53 from a 28 volt nominal input which is dropped and roughly regulated by a resistor 50 and a Zener diode 52. In the inactive state, a terminal 54 of Hall Effect switch 44 supplies no current and a transistor 56 is biased to an "OFF" state by a resistor 57. This in turn allows a transistor 58 to be biased to an "OFF" state by a resistor 60 and no motor current is supplied.

When the proper magnet pole turns on Hall Effect switch 44, as described with reference to FIGS. 3 and 4, the switch sources current from terminal 54 applied through a resistor 66 which turns on transistor 56 to saturation. Transistor 56 then sinks current from a resistor 62 and the base of transistor 58, whereupon transistor 58 is driven to saturation and supplies current to motor 36.

A metal oxide varistor (MOV) 64 is connected across the stator windings to suppress inductive kickback which occurs when transistor 58 turns "OFF" as the cycle repeats. This protects transistor 56 from very high transient voltages as are likely to be present. Capacitors 66 and 68 are included in the circuitry to suppress radiated and conducted radio frequency interference as may be required to meet certain application specifications.

What is claimed is:

1. A motor sustained stored energy gyroscope comprising:
    a hollow gyroscope rotor;
    a power spring disposed within the rotor and secured thereto, and being initially in a stored energy condition;
    means for holding the rotor stationary, and means for caging the gyroscope;
    means for actuating the rotor holding means to release the rotor, whereupon the power spring releases the stored energy to impart a rotational speed to the rotor;
    gyroscope uncaging means disposed within the rotor and arranged with the power spring for uncaging the gyroscope when the power spring unwinds such that the stored energy from the the spring has imparted a predetermined rotational speed to the rotor;
    a sustaining motor disposed within the gyroscope rotor and including a stator member and a magnetic rotor member in cooperative arrangement with the gyroscope rotor; and
    means for energizing the stator member to create a magnetic field which interacts with the rotor member for sustaining the predetermined rotational speed of the gyroscope rotor upon dissipation of the stored energy from the spring.

2. A motor sustained stored energy gyroscope as described by claim 1 including:
    an arbor;
    the gyroscope rotor surrounding the arbor and arranged to rotate thereabout;
    the power spring secured to the arbor and wound therearound when in the stored energy condition; and
    the power spring unwinding from the arbor to release the stored energy for imparting the rotational speed to the rotor when the rotor holding means is actuated to release the rotor.

3. A motor sustained stored energy gyroscope as described by claim 2, wherein the gyroscope uncaging means includes:
    means disposed adjacent the power spring when the spring is wound around the arbor in the stored energy condition, and operative to maintain the gyroscope in the caged condition; and
    said means being actuated when the power spring unwinds from the arbor to release the stored energy for imparting the predetermined rotational speed to the rotor, and thereupon being operative for uncaging the gyroscope.

4. A motor sustained stored energy gyroscope as described by claim 1, wherein:
the stored energy from the power spring is dissipated when the rotor is at the predetermined rotational speed and the gyroscope is uncaged.

5. A motor sustained stored energy gyroscope as described by claim 2, including:
the motor rotor element carried by the gyroscope rotor; and
the motor stator element carried by the arbor.

6. A motor sustained stored energy gyroscope comprising:
an arbor;
a hollow gyroscope rotor surrounding the arbor and arranged to rotate thereabout;
a power spring secured to the arbor and wound therearound so as to be in a stored energy condition, and secured to the rotor;
means for holding the rotor stationary and means for caging the gyroscope;
means for actuating the rotor holding means to release the rotor, whereupon the power spring unwinds from the arbor to release the stored energy to impart a rotational speed to the rotor;
means disposed adjacent the power spring when the spring is wound around the arbor in the stored energy condition and thereupon operative to maintain the gyroscope in the caged condition, and actuated when the power spring unwinds from the arbor to release the stored energy for imparting a predetermined rotational speed to the rotor and thereupon operative for uncaging the gyroscope, the stored energy from the power spring being dissipated when the rotor is at the predetermined rotational speed and the gyroscope is uncaged;
a sustaining motor having a magnetic rotor member carried by the gyroscope rotor and a stator member carried by the arbor; and
means for energizing the stator member to create a magnetic field which interacts with the rotor member for sustaining the predetermined rotational speed of the gyroscope rotor upon dissipation of the stored energy from the power spring.

* * * * *